United States Patent
Tagawa et al.

(10) Patent No.: US 11,137,191 B2
(45) Date of Patent: Oct. 5, 2021

(54) GAS SUPPLY DEVICE, DEVICE FOR CONTROLLING INSIDE AIR, AND REFRIGERATION DEVICE FOR CONTAINER

(71) Applicant: DAIKIN INDUSTRIES, LTD., Osaka (JP)

(72) Inventors: Hirotaka Tagawa, Osaka (JP); Kazuyasu Matsui, Osaka (JP); Makoto Ikemiya, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/630,236

(22) PCT Filed: Jul. 20, 2018

(86) PCT No.: PCT/JP2018/027331
§ 371 (c)(1),
(2) Date: Jan. 10, 2020

(87) PCT Pub. No.: WO2019/017484
PCT Pub. Date: Jan. 24, 2019

(65) Prior Publication Data
US 2020/0132355 A1 Apr. 30, 2020

(30) Foreign Application Priority Data

Jul. 21, 2017 (JP) .............................. JP2017-142277

(51) Int. Cl.
*F25D 11/00* (2006.01)
*B01D 46/10* (2006.01)
(Continued)

(52) U.S. Cl.
CPC ............ *F25D 11/003* (2013.01); *B01D 46/10* (2013.01); *A23B 7/148* (2013.01); *B01D 46/0005* (2013.01);
(Continued)

(58) Field of Classification Search
CPC ....... F25D 11/00; F25D 11/003; B01D 46/10; B01D 46/00; B01D 46/52; B01D 46/005;
(Continued)

(56) References Cited

U.S. PATENT DOCUMENTS

| 4,680,118 A | 7/1987 | Taga |
| 5,515,693 A | 5/1996 | Cahill-O'Brien et al. |

(Continued)

FOREIGN PATENT DOCUMENTS

| CN | 102717984 A | 10/2012 |
| EP | 1 386 651 A1 | 2/2004 |

(Continued)

OTHER PUBLICATIONS

Kuratani et al., Deodoring Device, Nov. 12, 1996, JPH08296950A, Whole Document (Year: 1996).*

(Continued)

*Primary Examiner* — Larry L Furdge
(74) *Attorney, Agent, or Firm* — Birch, Stewart, Kolasch & Birch, LLP

(57) ABSTRACT

In a gas supply device that supplies gas to a target space through a filter unit, the filter unit is composed of a filter box and an air filter housed in the filter box, and the air filter is a filter having a filter substrate made of a membrane filter and a fibrous coating layer covering a surface of the filter substrate through which air is sucked.

2 Claims, 11 Drawing Sheets

(51) Int. Cl.
  *A23B 7/148*  (2006.01)
  *B01D 46/00*  (2006.01)
  *B01D 46/52*  (2006.01)
(52) U.S. Cl.
  CPC ...... *B01D 46/521* (2013.01); *B01D 2239/065* (2013.01); *B01D 2275/10* (2013.01); *B32B 2307/724* (2013.01)
(58) Field of Classification Search
  CPC ............ B01D 46/521; B01D 2239/065; B01D 2275/10; B32B 2307/724; A23B 7/148
  See application file for complete search history.

(56) References Cited

U.S. PATENT DOCUMENTS

| | | | |
|---|---|---|---|
| 6,186,341 | B1 | 2/2001 | Konstantin et al. |
| 10,136,657 | B2 | 11/2018 | Kamei et al. |
| 2004/0168417 | A1* | 9/2004 | Tanaka ............... B01D 39/1692 55/486 |
| 2004/0198121 | A1* | 10/2004 | Huang ................. B29C 55/005 442/290 |
| 2014/0369894 | A1* | 12/2014 | Hingorani ............ F24F 3/1603 422/121 |
| 2016/0245555 | A1* | 8/2016 | Tanaka ................. A23B 7/0425 |
| 2016/0377338 | A1* | 12/2016 | Tanaka ................. A23L 3/3418 62/189 |
| 2018/0213808 | A1 | 8/2018 | Kamei et al. |
| 2018/0252461 | A1 | 9/2018 | Kamei et al. |

FOREIGN PATENT DOCUMENTS

| | | | |
|---|---|---|---|
| EP | 3 336 462 | A1 | 6/2018 |
| JP | 58-186410 | A | 10/1983 |
| JP | 61-97003 | A | 5/1986 |
| JP | 8-167 | A | 1/1996 |
| JP | H08296950 | A * | 11/1996 |
| JP | 2002-274608 | A | 9/2002 |
| JP | 2003-93845 | A | 4/2003 |
| JP | 2003-190730 | A | 7/2003 |
| JP | 2005074292 | A * | 3/2005 |
| JP | 2017-44444 | A | 3/2017 |
| JP | 2017-44445 | A | 3/2017 |
| WO | WO 2017/038038 | A1 | 3/2017 |
| WO | WO 2017/038055 | A1 | 3/2017 |

OTHER PUBLICATIONS

Hashimoto et al., Air Filter, Mar. 24, 2005, JP2005074292A, Whole Document (Year: 2005).*
International Search Report for PCT/JP2018/027331 dated Oct. 16, 2018.
Extended European Search Report dated Mar. 4, 2021 in corresponding European Application No. 18834578.9.

* cited by examiner

GAS SUPPLY DEVICE, DEVICE FOR CONTROLLING INSIDE AIR, AND REFRIGERATION DEVICE FOR CONTAINER

TECHNICAL FIELD

The present disclosure relates to a gas supply device including a filter unit and an air pump provided in a gas passage that supplies gas to a target space, an inside air control system that supplies a gas mixture generated in the gas supply device and having a high nitrogen concentration and a low oxygen concentration to the target space, and a container refrigeration apparatus equipped with the inside air control system.

BACKGROUND ART

Container refrigeration apparatuses including a refrigerant circuit performing a refrigeration cycle have been used to cool air in a container for use in, e.g., marine transportation (see, e.g., Patent Document 1). The container is loaded with plants such as bananas and avocados, for example. Plants breathe by absorbing oxygen in the air and releasing carbon dioxide even after they have been harvested. The plants lose their nourishment and moisture as they breathe. Thus, the degree of freshness of the plants decreases. Thus, the oxygen concentration in the container is preferably lowered not to cause breathing problems.

Patent Document 1 discloses an inside air control system. In this inside air control system, an adsorbent which adsorbs a nitrogen component in the air when pressurized is used to produce nitrogen-enriched air (gas mixture) having a lower oxygen concentration and a higher nitrogen concentration than the air, and this nitrogen-enriched air is supplied into the container to reduce the oxygen concentration of the air in the container, making it easier to reduce the amount of breathing of the plants and to keep the plants fresh. This inside air control system performs an adsorption operation of sending pressurized air using an air pump into an adsorption column housing the adsorbent to allow the adsorbent to adsorb the nitrogen component, and then performs a desorption operation of sucking the air using the air pump from the adsorption column to allow the adsorbent to desorb the nitrogen component adsorbed. As a result, the nitrogen-enriched air is produced.

Components of the inside air control system are housed in a sealed unit case, and the inside air control system configured as a single unit is disposed in an external space of the container refrigeration apparatus. The filter unit provided at an air inlet is disposed separately from the inside air control system, and is connected to the inside air control system with an air hose. The filter unit is provided with a membrane filter, which is covered with a sheet metal cover so that water is not directly applied thereto.

CITATION LIST

Patent Document

Patent Document 1: Japanese Unexamined Patent Publication No. 2017-044445

SUMMARY OF THE INVENTION

Technical Problem

However, in the conventional configuration, the filter needs to be replaced every voyage because of its short life.

Further, since the inside air control system is used at sea, a deliquescence phenomenon may occur if sea salt particles are attached to the filter. This may produce a water film on the surface of the membrane filter, and may increase pressure loss. If the pressure loss becomes too large, water may flow from a space upstream of the membrane filter to a downstream space, and may reach the air pump.

This problem is not limited to the inside air control system of the container refrigeration apparatus installed in a marine container, but may also arise in a gas supply device having components that require salt-damage resistance, e.g., a pump and a valve for feeding gas such as air through a filter into a warehouse or the like installed in a coastal area.

An object of the present disclosure is to block the life of a filter of a gas supply device from being shortened due to a deliquescence phenomenon caused by sea salt particles, and by extension, to block the filter life in an inside air control system or a container refrigeration apparatus equipped with the system from being shortened.

Solution to the Problem

A first aspect of the present disclosure is premised on a gas supply device including: a gas passage (40) that supplies gas to a target space (S); a filter unit (75) provided at an inlet of the gas passage (40); and an air pump (31) provided in the middle of the gas passage (40).

In the gas supply device, the filter unit (75) includes a filter box (90) and an air filter (76) housed in the filter box (90). The air filter (76) includes a filter substrate (77a, 77b) made of a membrane filter having waterproofness and air permeability, and a fibrous coating layer (78a, 78b) covering a surface of the filter substrate (77a, 77b) through which air is sucked.

According to the first aspect, the fibrous coating layer (78a, 78b) is formed on the surface of the filter substrate (77a, 77b) made of the membrane filter. Thus, in the case in which the gas supply device is installed in a coastal area, even if sea salt particles adhere to the air filter (76) to cause a deliquescence phenomenon at the time of supplying gas to the target space (S) via the filter unit (75) by the air pump (31), moisture does not form a water film on the surface of the fibrous coating layer (78a, 78b), and is absorbed into the coating layer (78a, 78b) by capillarity. This can suppress increase in the pressure loss of the air filter (76). Further, since increase in the excessive pressure loss can be suppressed, it is possible to suppress the flow of water from a space upstream of the air filter (76) to a downstream space A second aspect is an embodiment of the first aspect. In the second aspect, the air filter (76) is a pleated filter having a plurality of pleats (76a).

According to the second aspect, when the air pump (31) supplies the gas to the target space (S) via the filter unit (75), the gas passes through the pleated filter having a large gas passage area. The pleated filter is formed by stacking the fibrous coating layer (78a, 78b) on the surface of the filter substrate (77a, 77b) made of the membrane filter. Therefore, the air filter (76) on which a water film is less likely formed has a large gas passage area, and increase in the pressure loss of the air filter (76) can be reliably suppressed.

A third aspect is an embodiment of the second aspect. In the third aspect, the air filter (76) is arranged so that the pleats (76a) extend in a vertical direction.

According to the third aspect, when water adheres to the air filter (76) and is not absorbed by the coating layer (78a, 78b), water goes down along the pleats (76a) on the surface of the air filter (76), and drips down from the air filter (76)

when reaching the lower end of the pleats (76a). This can suppress increase in the pressure loss due to water adhered to the surface of the air filter (76).

A fourth aspect is an embodiment of any one of the first to third aspects. In the fourth aspect, the air filter (76) includes a stack of a plurality of filter substrates (77a, 77b).

According to the fourth aspect, the air filter (76) has the plurality of filter substrates (77a, 77b). This can suppress the entry of water into the air pump (31) and the target space (S).

A fifth aspect is premised on an inside air control system, including: a gas supply device (30); and a gas mixture generator (38) that generates a gas mixture having a higher nitrogen concentration and a lower oxygen concentration than air sucked through a filter unit (75) of the gas supply device (30).

In the inside air control system, the gas supply device (30) is the gas supply device (30) of any one of the first to fourth aspects, and gas generated by the gas mixture generator (38) is supplied to the target space (S) using the air pump (31).

A sixth aspect is premised on a container refrigeration apparatus, including: a casing (12) mounted on a container (11); components of a refrigerant circuit (20) attached to the casing (12); and an inside air control system (60) attached to the casing (12), wherein the container refrigeration apparatus is configured to cool an internal space (S) of the container (11), and supply a gas mixture to the internal space (S) of the container (11) using the inside air control system (60).

In the container refrigeration apparatus, the inside air control system (60) is the inside air control system (60) of the fifth aspect.

Advantages of the Invention

According to the first aspect, the fibrous coating layer (78a, 78b) is formed on the surface of the filter substrate (77a, 77b) made of the membrane filter. Thus, even if the gas supply device is installed in a coastal area, and sea salt particles adhere to the air filter (76) to cause a deliquescence phenomenon, moisture does not form a water film on the surface of the fibrous coating layer (78a, 78b), and is absorbed into the coating layer (78a, 78b) by capillarity. This can suppress increase in the pressure loss of the air filter (76). Further, since excessive increase in the pressure loss can be suppressed, it is possible to suppress the flow of water from the space upstream of the air filter (76) to the downstream space, and the damage to the air pump (31) can be reduced. Further, according to the first aspect, even when the gas supply device is used under the condition that salt damage may possibly be caused to the gas supply device, it is possible to suppress shortening of the life of the air filter (76) due to the deliquescence phenomenon caused by the sea salt particles.

According to the second aspect, when the air pump (31) supplies the gas to the target space (S) via the filter unit (75), the gas passes through a pleated filter having a large gas passage area. The surface of the filter substrate (77a, 77b) of the pleated filter is covered with the fibrous coating layer (78a, 78b). Thus, the air filter (76) on which a water film is less likely formed has a large gas passage area, and the pressure loss of the air filter (76) does not easily increase. This can extend the life of the air filter (76).

According to the third aspect, when water adheres to the air filter (76) and is not absorbed by the coating layer (78a, 78b), water goes down along the pleats (76a) on the surface of the air filter (76), and drips down from the air filter (76) when reaching the lower ends of the pleats (76a). Thus, it is possible to suppress increase in the pressure loss due to water adhered to the surface of the air filter (76). This can further extend the life of the air filter (76).

According to the fourth aspect, the air filter (76) has the plurality of filter substrates (77a, 77b). This can suppress entry of water into the air pump (31) and the target space (S), and can protect the air pump (31) and the contents of the target space (S) from damage caused by water.

According to the fifth aspect, the inside air control system can obtain the advantages of the first to fourth aspects. Further, according to the sixth aspect, the container refrigeration apparatus can obtain the advantages of the first to fourth aspects.

DESCRIPTION OF EMBODIMENTS

Embodiments will be described in detail with reference to the drawings. The present embodiment relates to a container refrigeration apparatus equipped with an inside air control system including a gas supply device according to the present disclosure. Note that the following description of the embodiment is merely an example in nature, and is not intended to limit the scope, applications, or use of the present disclosure.

Figure 1:
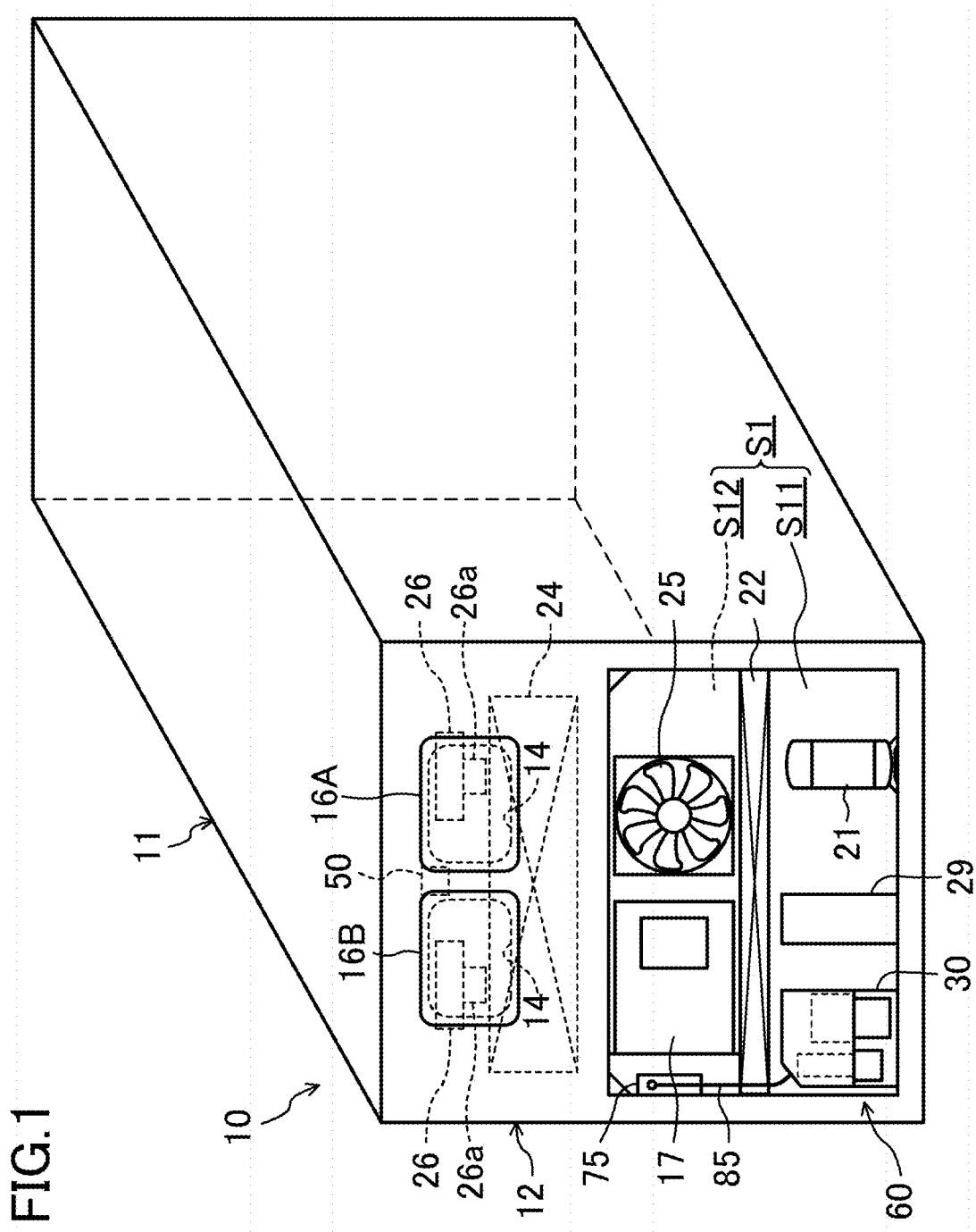
FIG. 1 is a perspective view illustrating a container refrigeration apparatus according to an embodiment as viewed from outside.
Figure 2:
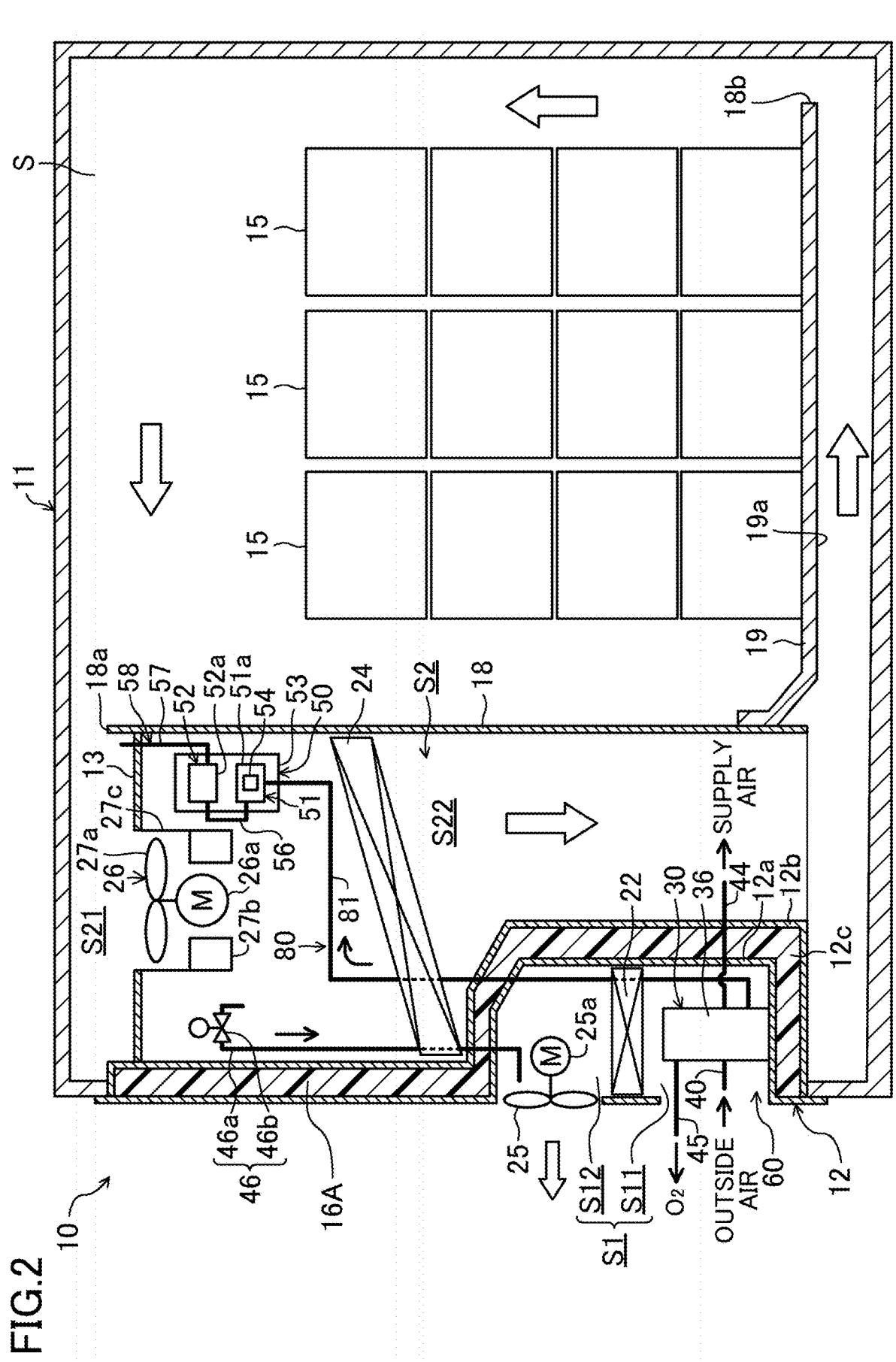
FIG. 2 is a sectional side view illustrating a general configuration of a container refrigeration apparatus.

As shown in FIGS. 1 and 2, a container refrigeration apparatus (10) is provided for a container (11) for use in, e.g., marine transportation, and cools the air in the container (11). Boxed plants (15) are stored in an internal space (target space) (S) of the container (11). The plants (15) breathe by absorbing oxygen ($O_2$) in the air and releasing carbon dioxide ($CO_2$) into the air, and examples of such plants (15) include fruit like bananas and avocados, vegetables, cereals, bulbous plants, and natural flowers.

The container (11) has the shape of an elongate box with an open end surface. The container refrigeration apparatus (10) includes a casing (12), a refrigerant circuit (20), and a controlled atmosphere (CA) system (inside air control system) (60), and is attached to close the open end of the container (11).

<Casing>

As shown in FIG. 2, the casing (12) includes an exterior wall (12a) disposed outside the container (11), and an interior wall (12b) disposed inside the container (11). The exterior and interior walls (12a) and (12b) may be made of an aluminum alloy, for example.

The exterior wall (12a) is attached to the periphery of the opening of the container (11) so as to close the open end of the container (11). The exterior wall (12a) is formed such that the lower part thereof protrudes into the container (11).

The interior wall (12b) is disposed to face the exterior wall (12a). The interior wall (12b) protrudes into the container just like the lower part of the exterior wall (12a). A thermal insulator (12c) fills the space between the interior and exterior walls (12b, 12a).

As can be seen, the lower part of the casing (12) is formed to protrude into the container (11). Thus, an external storage space (S1) is formed outside the container (11) and in the lower part of the casing (12), and an internal storage space (S2) is formed inside the container (11) and in the upper part of the casing (12).

As shown in FIG. 1, the casing (12) includes two access openings (14) for maintenance arranged side by side in a width direction of the casing (12). The two access openings (14) are closed respectively by first and second access doors (16A, 16B) which are openable and closable. Each of the first and second access doors (16A, 16B) includes, just like the casing (12), an exterior wall, an interior wall, and a thermal insulator.

As shown in FIG. 2, a partition plate (18) is disposed in the interior of the container (11). This partition plate (18) is formed in the shape of a substantially rectangular plate member, and stands upright so as to face the wall of the casing (12) inside the container (11). This partition plate (18) separates the internal storage space (S2) from the internal space (S) of the container (11).

A suction port (18a) is formed between the upper end of the partition plate (18) and a ceiling surface of the container (11). Air in the container (11) is taken into the internal storage space (S2) through the suction port (18a).

The internal storage space (S2) is further provided with a partition wall (13) extending in the horizontal direction. The partition wall (13) is attached to an upper end portion of the partition plate (18), and has an opening in which internal fans (26), which will be described later, are disposed. This partition wall (13) partitions the internal storage space (S2) into a primary space (S21) on the suction side of the internal fans (26), and a secondary space (S22) on the blowout side of the internal fans (26). In this embodiment, the partition wall (13) divides the internal storage space (S2) lengthwise in two spaces such that the primary space (S21) on the suction side is disposed above the secondary space (S22) on the blowout side.

A floorboard (19) is disposed in the container (11) with a gap left between the floorboard (19) and the bottom surface of the container (11). Boxed plants (15) are placed on the floorboard (19). An underfloor path (19a) is formed between the floorboard (19) and the bottom surface of the container (11). A gap is left between the lower end of the partition plate (18) and the bottom surface of the container (11), and communicates with the underfloor path (19a).

A blowout port (18b) through which the air which has been cooled by the container refrigeration apparatus (10) is blown into the internal space (S) of the container (11) is provided at an end of the floorboard (19) opposite from the open end of the container (11) (on the right side in FIG. 2).

<Configuration and Arrangement of Refrigerant Circuit and Other Components>

Figure 3:
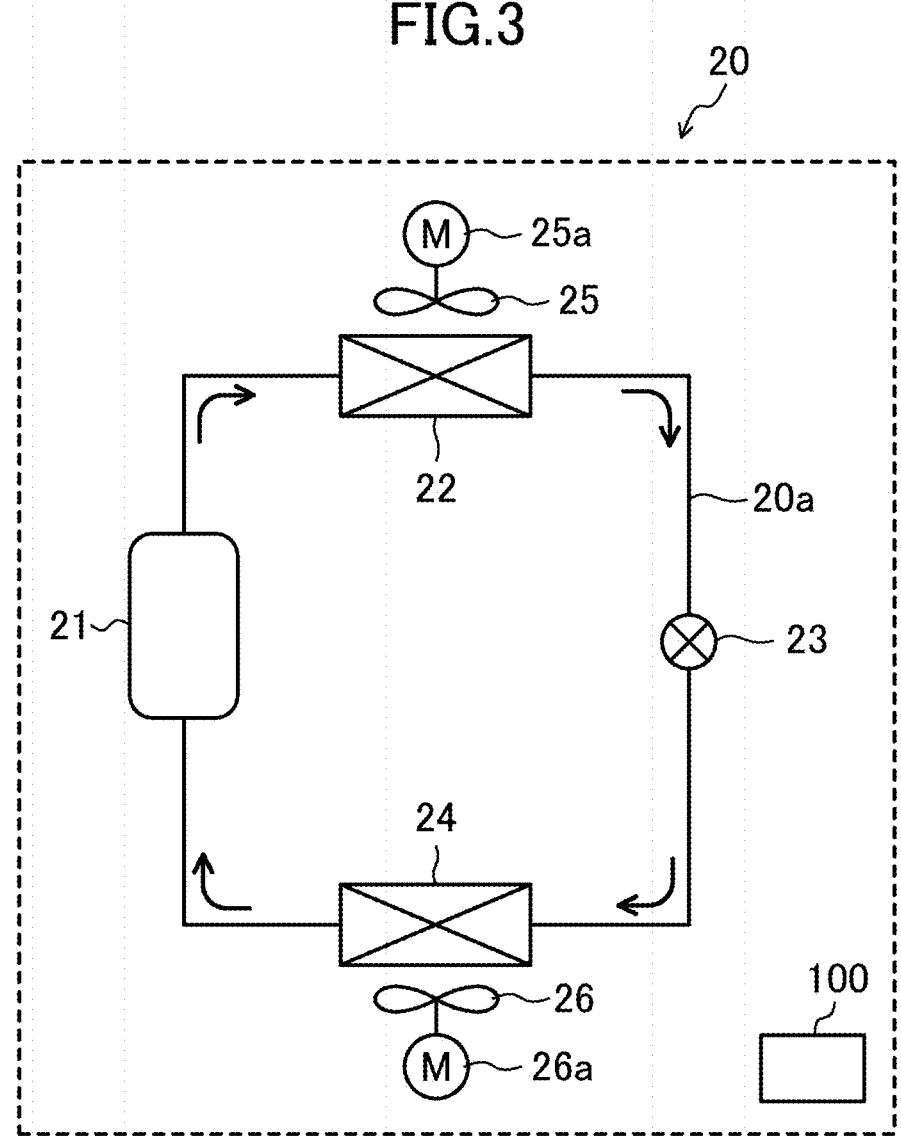
FIG. 3 is a piping system diagram illustrating a configuration of a refrigerant circuit of the container refrigeration apparatus.

As shown in FIG. 3, the refrigerant circuit (20) is a closed circuit in which a compressor (21), a condenser (22), an expansion valve (23), and an evaporator (24) are connected together in this order by a refrigerant piping (20a).

An external fan (25) is disposed near the condenser (22). The external fan (25) is driven in rotation by an external fan motor (25a), guides the air in the external space of the container (11) (i.e., outside air) into the external storage space (S1), and sends it to the condenser (22). In the condenser (22), heat is exchanged between a refrigerant compressed in the compressor (21) and flowing through the condenser (22) and the outside air sent to the condenser (22) by the external fan (25). In this embodiment, the external fan (25) is comprised of a propeller fan.

Two internal fans (26) are disposed near the evaporator (24). The internal fans (26) are driven in rotation by internal fan motors (26a), draw the air in the container (11) through the suction port (18a), and blow the air toward the evaporator (24). In the evaporator (24), heat is exchanged between a refrigerant having a pressure dropped by the expansion valve (23) and flowing through the evaporator (24) and the air in the container sent to the evaporator (24) by the internal fans (26).

As shown in FIG. 2, each of the internal fans (26) includes a propeller fan (rotary vane) (27a), a plurality of stationary vanes (27b), and a fan housing (27c). The propeller fan (27a) is coupled to the internal fan motor (26a), and driven in rotation by the internal fan motor (26a) about a rotation axis to blow the air in an axial direction. The plurality of stationary vanes (27b) are disposed on the blowout side of the propeller fan (27a) to rectify the flow of swirling air blown from the propeller fan (27a). The fan housing (27c) is comprised of a cylindrical member with the plurality of stationary vanes (27b) attached to its inner peripheral surface, and extends to, and surrounds, the outer periphery of the propeller fan (27a).

As shown in FIG. 1, the compressor (21) and the condenser (22) are housed in the external storage space (S1). The condenser (22), located in the middle of the external storage space (S1) in the vertical direction, divides the external storage space (S1) into a lower first space (S11) and an upper second space (S12). In the first space (S11), the compressor (21), an inverter box (29) which houses a driver circuit for driving the compressor (21) at a variable velocity, and a gas supply device (30) of the CA system (60) are disposed. The external fan (25) and an electric component box (17) are disposed in the second space (S12). The first space (S11) is open toward the exterior space of the container (11). A plate member is arranged to close the second space (S12) from the external space of the container such that only a blowout port of the external fan (25) is open toward the exterior space of the container.

As shown in FIG. 2, the evaporator (24) is housed in the secondary space (S22) of the internal storage space (S2). The two internal fans (26) are disposed above the evaporator (24) in the internal storage space (S2) and arranged side by side in the width direction of the casing (12).

<CA System>

Figure 4:
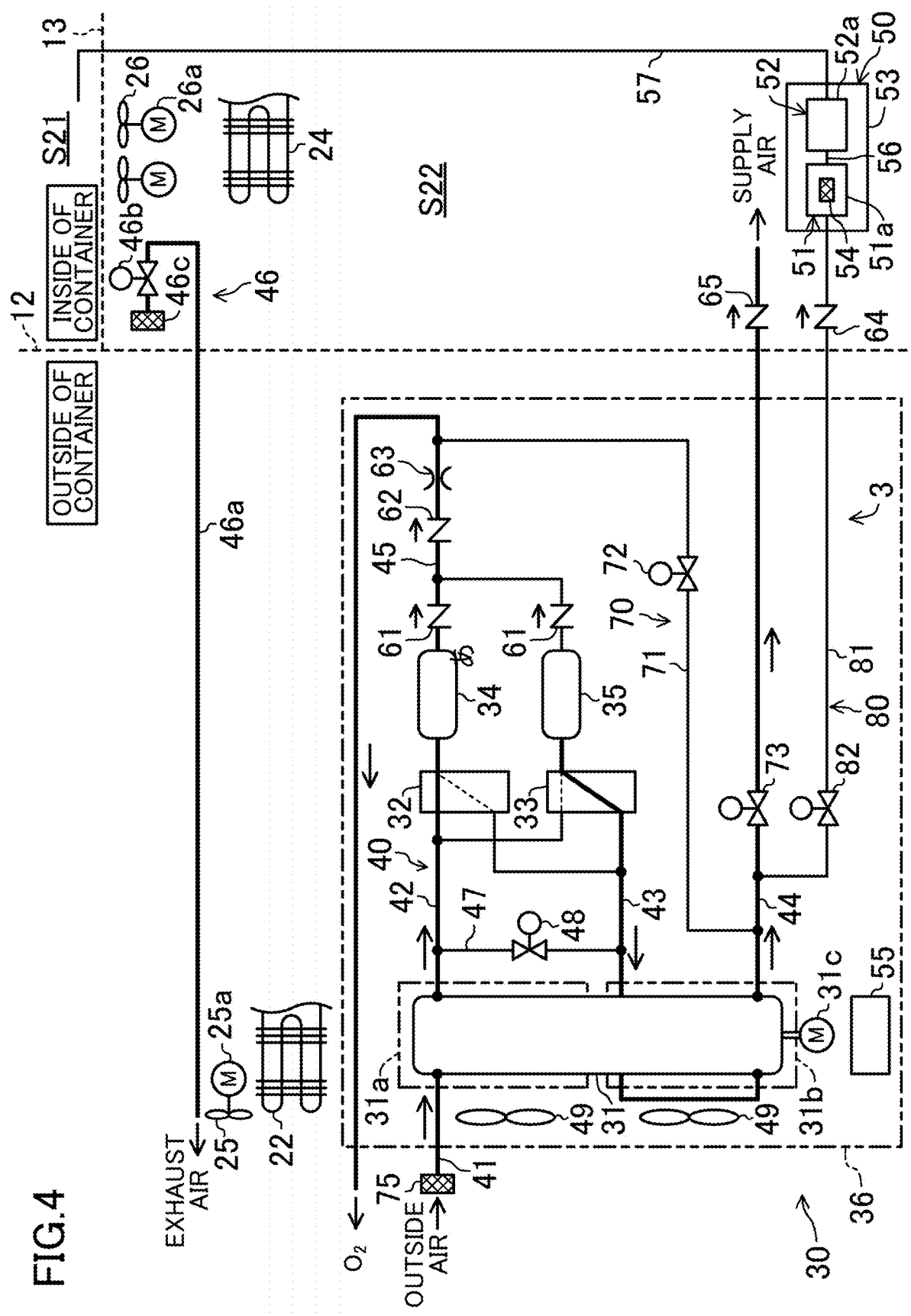
FIG. 4 is a piping system diagram illustrating a configuration of a CA system of the container refrigeration apparatus, together with the flow of air during a first operation.

As shown in FIG. 4, the CA system (60) includes the gas supply device (30), an exhaust portion (46), a sensor unit (50), a controller (55), and a filter unit (75), and controls the oxygen concentration and carbon dioxide concentration of the air in the container (11). The term "concentration" to be used in the following description always indicates a "volumetric concentration."

[Gas Supply Device]

—Configuration of Gas Supply Device—

The gas supply device (30) sucks the air (gas) from the filter unit (75), and feeds nitrogen-enriched air into the internal space (S), which is the target space (S), of the container (11). In the present embodiment, the gas supply device (30) is configured by a VPSA (Vacuum Pressure Swing Adsorption). Further, the gas supply device (30) is disposed at a lower left corner of the external storage space (S1), as shown in FIG. 1.

As shown in FIG. 4, the gas supply device (30) includes an air circuit (3) connecting together an air pump (31), first and second directional control valves (32) and (33), and first and second adsorption columns (34) and (35) each provided with an adsorbent for adsorbing a nitrogen component in the air, and a unit case (36) housing these components of the air circuit (3). In this manner, the gas supply device (30) forms a single unit with these components housed in the unit case (36), and is configured to be retrofitted to the container refrigeration apparatus (10).

(Air Pump)

The air pump (31) is provided in the middle of a gas passage (40) including an outside air passage (41), a discharge passage (42), a suction passage (43), and a supply passage (44). The filter unit (75), which will be described later, is provided at an inlet of the gas passage (40).

The air pump (31) is provided in the unit case (36), and includes a first pump mechanism (a pressurizing portion) (31a) and a second pump mechanism (a depressurizing portion) (31b), each of which sucks and compresses the air and discharges compressed air. The first and second pump mechanisms (31a) and (31b) are connected to a drive shaft of a motor (31c), and are driven in rotation by the motor (31c) to suck and compress the air, and discharge the compressed air.

One end of the outside air passage (41) which is arranged to pass through the unit case (36) from the interior to exterior of the unit case (36) is connected to an inlet of the first pump mechanism (31a). The filter unit (75) having an air filter is provided at the other end of the outside air passage (41). The outside air passage (41) is made of a flexible tube. Although not shown in the drawings, the other end of the outside air passage (41) where the filter unit (75) is provided is arranged in the second space (S12) of the external storage space (S1) above the condenser (22). Due to this configuration, the first pump mechanism (31a) sucks and compresses the outside air from which moisture has been removed while the outside air flows from the outside to inside of the unit case (36) through the filter unit (75) provided at the other end of the outside air passage (41). On the other hand, an outlet of the first pump mechanism (31a) is connected to one end of the discharge passage (42). The other end (downstream end) of the discharge passage (42) is divided into two branches, which are connected to the first and the second directional control valves (32) and (33), respectively.

An inlet of the second pump mechanism (31b) is connected to one end of the suction passage (43). The other end (upstream end) of the suction passage (43) is divided into two branches, which are connected to the first and second directional control valves (32) and (33), respectively. An outlet of the second pump mechanism (31b) is connected to one end of the supply passage (44). The other end of the supply passage (44) opens in the secondary space (S22) on the blowout side of the internal fans (26) in the internal storage space (S2) of the container (11). The supply passage (44) is provided with a check valve (65) at the other end portion thereof. The check valve (65) allows the air to flow only from one end to the other end of the supply passage (44) and prevents backflow of the air.

In this embodiment, the discharge passage (42) and the suction passage (43) are connected via a bypass passage (47). The bypass passage (47) is provided with a bypass on-off valve (48), an opening/closing operation of which is controlled by the controller (55).

The first and second pump mechanisms (31a) and (31b) of the air pump (31) are configured as oil-free pumps without lubricant oil. Two blower fans (49) are disposed on the side of the air pump (31) to cool the air pump (31) by blowing air toward the air pump (31).

(Gas Mixture Generator (38))

In the present embodiment, a gas mixture generator (38) is comprised of the following directional control valves (32, 33) and adsorption columns (34, 35).

(Directional Control Valve)

The first and second directional control valves (32) and (33) are provided in the air circuit (3) between the air pump (31) and the first and second adsorption columns (34) and (35), and switches the connection between the air pump (31) and the first and second adsorption columns (34) and (35) among three connection states described later (first to third connection states). The controller (55) controls the switching.

Specifically, the first directional control valve (32) is connected to the discharge passage (42) connected to the outlet of the first pump mechanism (31a), the suction passage (43) connected to the inlet of the second pump mechanism (31b), and one end portion of the first adsorption column (34) (functioning as an inlet during pressurization). The first directional control valve (32) switches between a first state where the first adsorption column (34) is allowed to communicate with the outlet of the first pump mechanism (31a) to be blocked from the inlet of the second pump mechanism (31b) (the state shown in FIG. 4), and a second state where the first adsorption column (34) is allowed to communicate with the inlet of the second pump mechanism (31b) to be blocked from the outlet of the first pump mechanism (31a) (the state shown in FIG. 5).

The second directional control valve (33) is connected to the discharge passage (42) connected to the outlet of the first pump mechanism (31a), the suction passage (43) connected to the inlet of the second pump mechanism (31b), and one end portion of the second adsorption column (35). The second directional control valve (33) switches between the first state where the second adsorption column (35) is allowed to communicate with the inlet of the second pump mechanism (31b) to be blocked from the outlet of the first pump mechanism (31a) (the state shown in FIG. 4), and the second state where the second adsorption column (35) is allowed to communicate with the outlet of the first pump mechanism (31a) to be blocked from the inlet of the second pump mechanism (31b) (the state shown in FIG. 5).

If the first and second directional control valves (32) and (33) are set to be the first state, the air circuit (3) is switched to a first connection state where the outlet of the first pump mechanism (31a) is connected to the first adsorption column (34), and the inlet of the second pump mechanism (31b) is connected to the second adsorption column (35) (see FIG. 4). In this state, an adsorption operation is performed on the first adsorption column (34) to adsorb a nitrogen component in the outside air onto the adsorbent, and a desorption operation is performed on the second adsorption column (35) to desorb the nitrogen component adsorbed onto the adsorbent.

Figure 5:
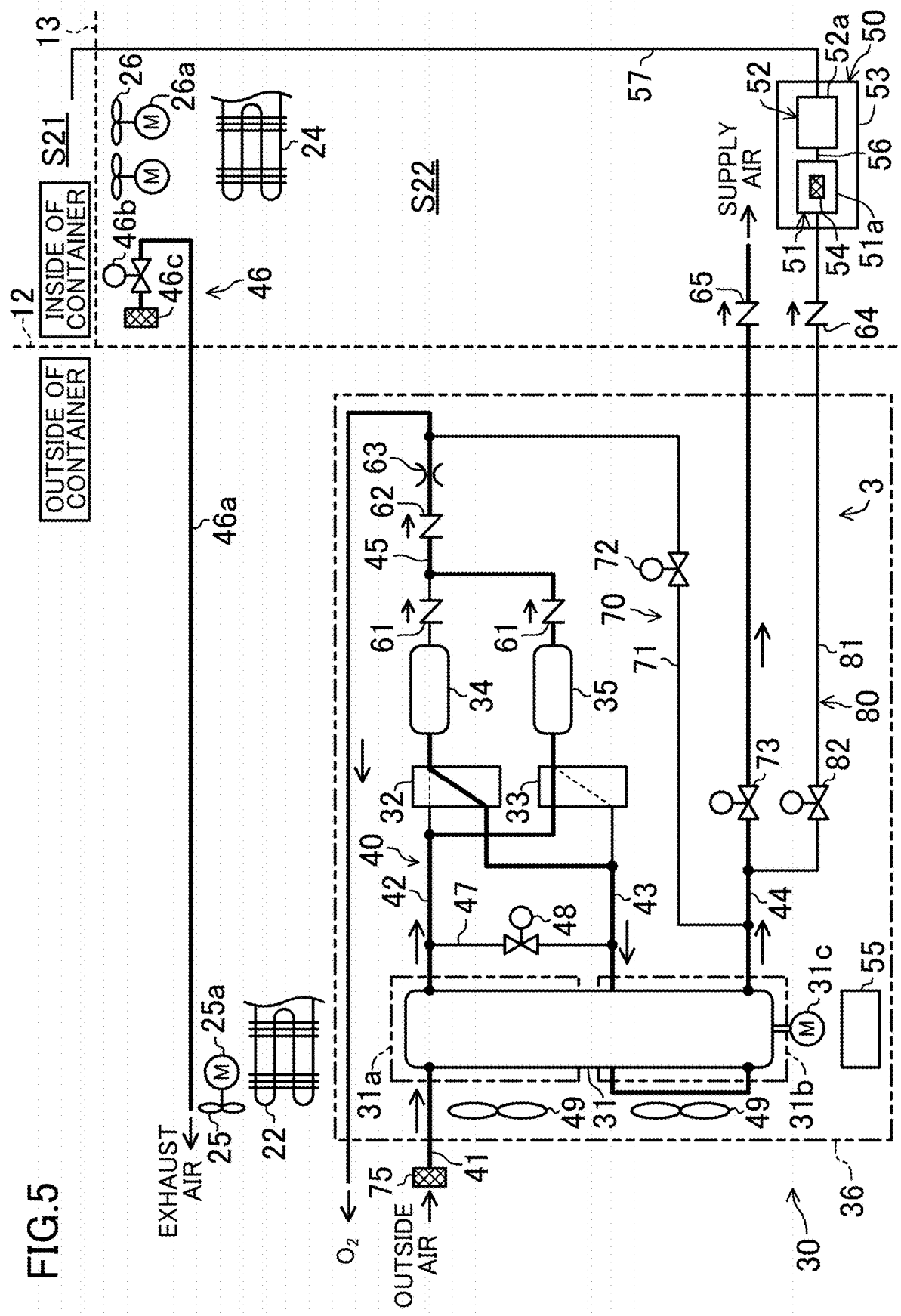
FIG. 5 is a piping system diagram illustrating a configuration of the CA system of the container refrigeration apparatus, together with the flow of air during a second operation.

If the first and second directional control valves (32) and (33) are set to be the second state, the air circuit (3) is switched to a second connection state where the outlet of the first pump mechanism (31a) is connected to the second adsorption column (35), and the inlet of the second pump mechanism (31b) is connected to the first adsorption column (34) (see FIG. 5). In this state, the adsorption operation is performed on the second adsorption column (35), and the desorption operation is performed on the first adsorption column (34).

If the first directional control valve (32) is set to be the first state, and the second directional control valve (33) is set to be the second state, the air circuit (3) is switched to a third connection state where the outlet of the first pump mechanism (31a) is connected to the first adsorption column (34), and the outlet of the first pump mechanism (31a) is connected to the second adsorption column (35) (not shown). In this state, both of the first and second adsorption columns (34) and (35) are connected to the outlet of the first pump mechanism (31a), and compressed outside air is supplied from the first pump mechanism (31a) to both of the first and second adsorption columns (34) and (35). In this state, the adsorption operation is performed on both of the first and second adsorption columns (34) and (35).

(Adsorption Column)

The first and second adsorption columns (34) and (35) are configured as cylindrical members filled with an adsorbent. The adsorbent that fills the first and second adsorption columns (34) and (35) adsorbs a nitrogen component in a state where the adsorption columns (34, 35) are pressurized, and desorbs the nitrogen component in a state where these adsorption columns (34, 35) are depressurized.

The adsorbent that fills the first and second adsorption columns (34) and (35) may be comprised of porous zeolite having pores with a diameter smaller than the diameter of nitrogen molecules (3.0 angstrom) and larger than the diameter of oxygen molecules (2.8 angstrom), for example. The nitrogen component in the air may be adsorbed using zeolite having pores of such a diameter as the adsorbent.

Cations exist in the pores of zeolite, and thus an electric field is generated to cause polarity. Therefore, zeolite has the property of adsorbing polarity molecules such as water molecules. As a result, the adsorbent made of zeolite and filling the first and second adsorption columns (34) and (35) adsorbs not only nitrogen but also moisture (vapor) in the air. The moisture adsorbed onto the adsorbent is desorbed from the adsorbent together with the nitrogen component as a result of the desorption operation. Consequently, nitrogen-enriched air including moisture is supplied into the internal space (S) of the container (11), thus increasing the humidity in the internal space (S). Furthermore, the adsorbent is regenerated, which may extend the adsorbent's life.

In this configuration, if the air pump (31) supplies the compressed outside air to the first and second adsorption columns (34) and (35) to pressurize these columns (34) and (35), the nitrogen component in the outside air is adsorbed onto the adsorbent. This produces oxygen-enriched air that has had its nitrogen concentration lowered and oxygen concentration increased by including less nitrogen component than the outside air does. On the other hand, if the air pump (31) sucks the air from the first and second adsorption columns (34) and (35) to depressurize these columns (34) and (35), the nitrogen component adsorbed onto the adsorbent is desorbed. This produces nitrogen-enriched air that has had its nitrogen concentration increased and oxygen concentration lowered by including more nitrogen component than the outside air does. In this embodiment, the nitrogen-enriched air of 92% nitrogen and 8% oxygen, for example, is produced.

The respective other ends of the first and second adsorption columns (34) and (35) (functioning as outlets during pressurization) are connected to one end of an oxygen discharge passage (45) through which the oxygen-enriched air that has been produced in the first and second adsorption columns (34) and (35) from the compressed outside air supplied by the first pump mechanism (31a) is guided toward the outside of the container (11). The one end of the oxygen discharge passage (45) is divided into two branches, which are connected to the other ends of the first and second adsorption columns (34) and (35), respectively. The other end of the oxygen discharge passage (45) opens outside the gas supply device (30), i.e., outside the container (11). The branches of the oxygen discharge passage (45) are connected to the other ends of the first and second adsorption columns (34) and (35), respectively. Each of the junction portions is provided with a check valve (61) which prevents backflow of the air from the oxygen discharge passage (45) toward the first and second adsorption columns (34) and (35).

A check valve (62) and an orifice (63) are arranged at some midpoints of the oxygen discharge passage (45) so as to be sequentially arranged from one end to the other end of the oxygen discharge passage (45). The check valve (62) prevents backflow of the nitrogen-enriched air from an exhaust connection passage (71), which will be described later, toward the first and second adsorption columns (34) and (35). The orifice (63) depressurizes the oxygen-enriched air which has flowed out of the first and second adsorption columns (34) and (35) before the oxygen-enriched air is discharged to the outside of the container.

(Supply-Discharge Switching Mechanism)

The air circuit (3) is provided with a supply-discharge switching mechanism (70) that switches between a gas supply operation, which will be described later (see FIGS. 4 and 5), of supplying the produced nitrogen-enriched air into the internal space (S) of the container (11), and a gas discharge operation (not shown) of discharging the produced nitrogen-enriched air to the outside of the container. The supply-discharge switching mechanism (70) includes an exhaust connection passage (71), an exhaust on-off valve (72), and a supply on-off valve (73).

The exhaust connection passage (71) has one end connected to the supply passage (44), and the other end connected to the oxygen discharge passage (45). The other end of the exhaust connection passage (71) is connected to the oxygen discharge passage (45) so as to be located further toward the outside of the container than the orifice (63).

The exhaust on-off valve (72) is provided for the exhaust connection passage (71). The exhaust on-off valve (72) is provided at a midpoint of the exhaust connection passage (71), and is comprised of a solenoid valve which is switched between an open state where the flow of the nitrogen-enriched air from the supply passage (44) is allowed, and a closed state where the flow of the nitrogen-enriched air is suppressed. The controller (55) controls an opening/closing operation of the exhaust on-off valve (72).

The supply on-off valve (73) is provided for the supply passage (44) so as to be located further toward the other end (toward the inside of the container) than the junction where the exhaust connection passage (71) is connected to the supply passage (40). The supply on-off valve (73), which is located further toward the inside of the container than the junction between the supply passage (44) and the exhaust connection passage (71), is comprised of a solenoid valve which is switched between an open state where the flow of the nitrogen-enriched air toward the inside of the container is allowed, and a closed state where the flow of the nitrogen-enriched air toward the inside of the container is suppressed. The controller (55) controls an opening/closing operation of the supply on-off valve (73).

(Measurement Unit)

The air circuit (3) is provided with a measurement unit (80) for performing a supply air measurement operation (not shown) to measure the concentration of the produced nitrogen-enriched air using an oxygen sensor (51) of the sensor unit (50), which will be described later, provided in the internal space (S) of the container (11). The measurement unit (80) includes a branch pipe (a measurement passage) (81) and a measurement on-off valve (82), and allows part of the nitrogen-enriched air flowing through the supply passage (44) to be diverged toward the oxygen sensor (51).

Specifically, the branch pipe (81) has one end connected to the supply passage (44), and the other end coupled to an oxygen sensor box (51a), which will be described later, of the oxygen sensor (51). In this embodiment, the branch pipe (81) is branched from the supply passage (44) in the unit case (36) and extends from the interior to exterior of the unit case (36).

The measurement on-off valve (82) is provided for the branch pipe (81) in the unit case. The measurement on-off valve (82) is comprised of a solenoid valve which switches between an open state where the flow of the nitrogen-enriched air in the branch pipe (81) is allowed, and a closed state where the flow of the nitrogen-enriched air in the branch pipe (81) is suppressed. The controller (55) controls an opening/closing operation of the measurement on-off valve (82). As will be described in detail later, the measurement on-off valve (82) is open only when a supply air measurement operation to be described later is performed, and is closed in the other modes.

[Exhaust Portion]

—Configuration of Exhaust Portion—

As shown in FIG. 2, the exhaust portion (46) includes an exhaust passage (46a) connecting the internal storage space (S2) and the external space of the container together, an exhaust valve (46b) connected to the exhaust passage (46a), and a membrane filter (46c) provided at an inlet end (an end located inside the container) of the exhaust passage (46a). The exhaust passage (46a) passes through the casing (12) from the interior to exterior of the casing (12). The exhaust valve (46b) is provided adjacent to an internal end of the exhaust passage (46a), and is comprised of a solenoid valve which is switched between an open state where the flow of the air in the exhaust passage (46a) is allowed, and a closed state where the flow of the air in the exhaust passage (46a) is suppressed. The controller (55) controls an opening/closing operation of the exhaust valve (46b).

—Operation of Exhaust Portion—

When the internal fans (26) are rotating, an exhaust operation is performed. That is, the controller (55) opens the exhaust valve (46b) to discharge the air (inside air) in the internal storage space (S2) communicating with the internal space (S) to the outside of the container.

Specifically, when the internal fans (26) are rotating, the pressure of the secondary space (S22) on the blowout side becomes higher than the pressure of the external space of the container (i.e., the atmospheric pressure). Thus, when the exhaust valve (46b) is open, due to the pressure difference between the ends of the exhaust passage (46a) (the pressure difference between the external space of the container and the secondary space (S22)), the air in the internal storage space (S2) communicating with the internal space (S) (inside air) is discharged to the outside of the container via the exhaust passage (46a).

[Sensor Unit]

—Configuration of Sensor Unit—

As shown in FIG. 2, the sensor unit (50) is provided in the secondary space (S22) on the blowout side of the internal fans (26) in the internal storage space (S2). The sensor unit (50) includes an oxygen sensor (51), a carbon dioxide sensor (52), a fixing member (53), a membrane filter (54), a connection pipe (56), and an exhaust pipe (57).

The oxygen sensor (51) has an oxygen sensor box (51a) housing a galvanic-cell sensor therein. The oxygen sensor (51) measures the value of a current flowing through an electrolytic solution of the galvanic-cell sensor to measure the oxygen concentration of a gas in the oxygen sensor box (51a). An outer surface of the oxygen sensor box (51a) is fixed to the fixing member (53). Another outer surface of the oxygen sensor box (51a) opposite from the outer surface fixed to the fixing member (53) has an opening, to which the membrane filter (54), which is air-permeable and water-proof, is attached. One end of the connection pipe (56) is coupled via a connector to one of the side surfaces of the oxygen sensor box (51a). Further, the branch pipe (81) of the measurement unit (80) is coupled via a connector (pipe joint) to a lower surface of the oxygen sensor box (51a).

The carbon dioxide sensor (52) has a carbon dioxide sensor box (52a). The carbon dioxide sensor (52) is a non-dispersive infrared (NDIR) sensor which radiates infrared rays to the gas in the carbon dioxide sensor box (52a) to measure an absorption amount of infrared rays having a wavelength specific to carbon dioxide, thereby measuring the carbon dioxide concentration in the gas. The other end of the connection pipe (56) is coupled via a connector to one side surface of the carbon dioxide sensor box (52a). One end of the exhaust pipe (57) is coupled via a connector to the other side surface of the carbon dioxide sensor box (52a).

The fixing member (53) is fixed to the casing (12) with the oxygen sensor (51) and the carbon dioxide sensor (52) attached thereto.

The connection pipe (56) is, as described above, coupled to the one side surface of the oxygen sensor box (51a) and the one side surface of the carbon dioxide sensor box (52a), and allows the internal space of the oxygen sensor box (51a) to communicate with the internal space of the carbon dioxide sensor box (52a).

As described above, the exhaust pipe (57) has one end coupled to the other side surface of the carbon dioxide sensor box (52a), and the other end open near the suction port of the internal fans (26). That is, the exhaust pipe (57) allows the internal space of the carbon dioxide sensor box (52a) to communicate with the primary space (S21) of the internal storage space (S2).

—Concentration Measurement Operation—

The secondary and primary spaces (S22) and (S21) of the internal storage space (S2) communicate with each other via an air passage (58) formed by the membrane filter (54), the internal space of the oxygen sensor box (51a), the connection pipe (56), the internal space of the carbon dioxide sensor box (52a), and the exhaust pipe (57). Thus, when the internal fans (26) are rotating, the pressure of the primary space (S21) becomes lower than the pressure of the secondary space (S22). Due to this pressure difference, the air in the container flows from the secondary space (S22) to the primary space (S21) in the air passage (58) to which the oxygen sensor (51) and the carbon dioxide sensor (52) are connected. Thus, the inside air sequentially flows through the oxygen sensor (51) and the carbon dioxide sensor (52), and then the oxygen concentration of the air is measured by the oxygen sensor (51), and the carbon dioxide concentration of the air is measured by the carbon dioxide sensor (52).

[Controller]

The controller (55) is configured to perform a concentration control operation for controlling the oxygen concentration and carbon dioxide concentration of the air in the container (11) to desired concentrations, respectively. Specifically, the controller (55) controls the operation of the gas supply device (30) and the exhaust portion (46) based on measurement results obtained by the oxygen sensor (51) and the carbon dioxide sensor (52) so that the oxygen concentration and carbon dioxide concentration of the air in the container (11) are controlled to desired target concentrations (e.g., 3% oxygen and 5% carbon dioxide).

[Filter Unit]

Figure 6:
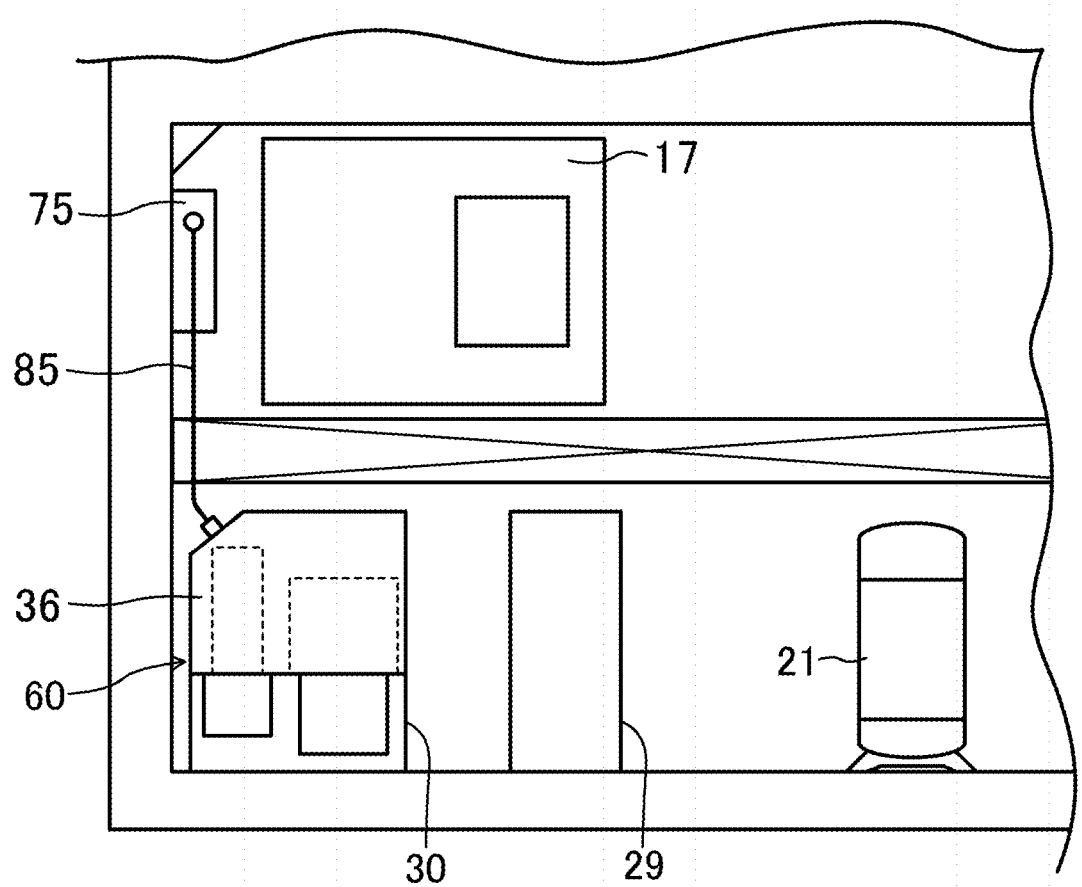
FIG. 6 is an enlarged perspective view illustrating a major part of the container refrigeration apparatus.

As shown in FIGS. 1 and 6, the gas supply device (30) is disposed at the lower left corner of the external storage space (S1) (at the lower left end of the condenser (22)), and the filter unit (75) is disposed at the left of the electric component box (17) when the external storage space (51) is viewed from the front. The filter unit (75) is provided for taking air into the gas supply device (30). Specifically, the filter unit (75) is arranged on a left inner surface of the external storage space (51) of the casing (11). The air pump (31) in the unit case (36) is connected to one end of an air tube (85) constituting the outside air passage (41) for sucking the air. The filter unit (75) is connected to the other end of the air tube (85).

Figure 7:
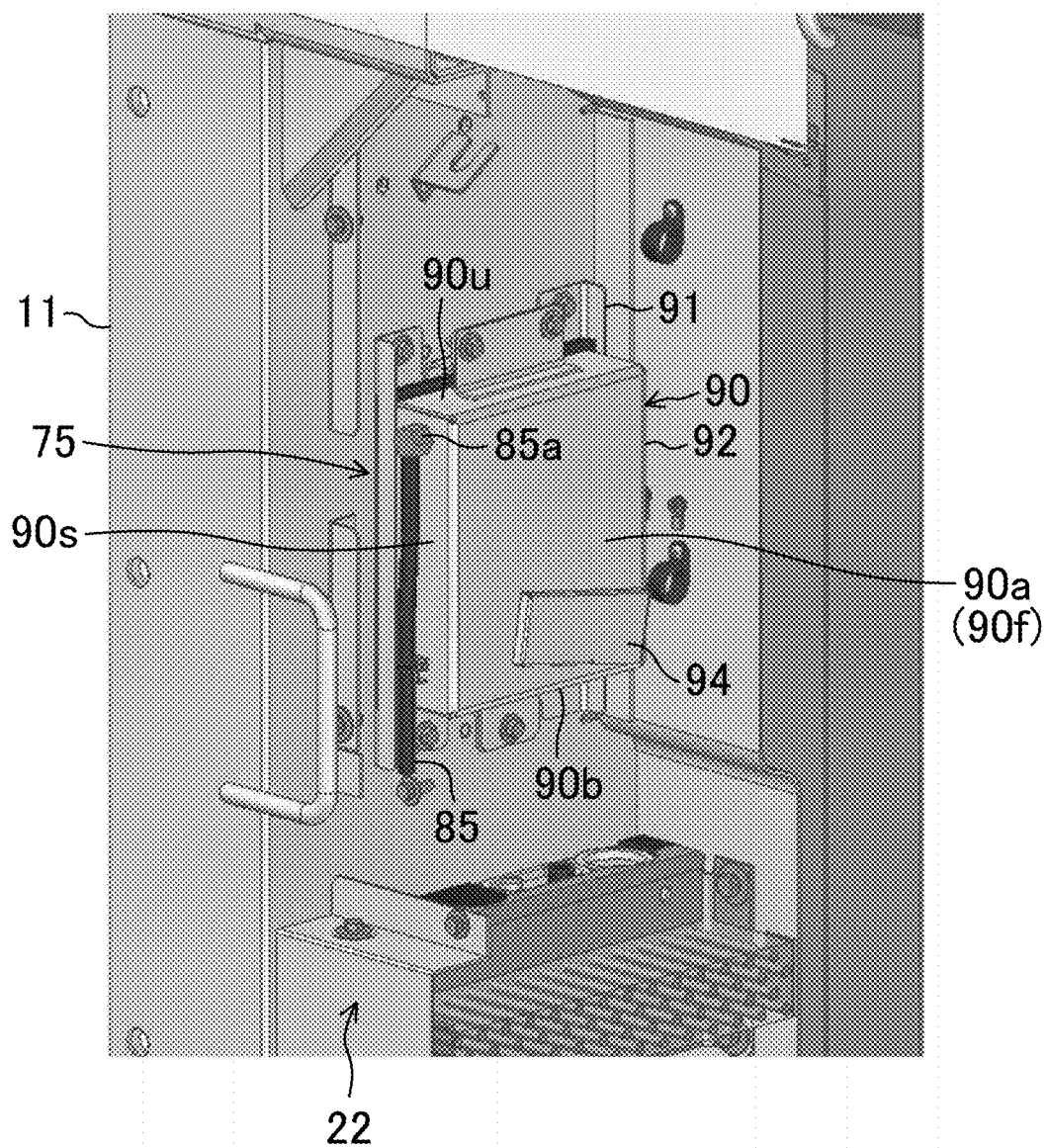
FIG. 7 is a perspective view illustrating the container refrigeration apparatus with a filter unit attached to a casing.
Figure 8:
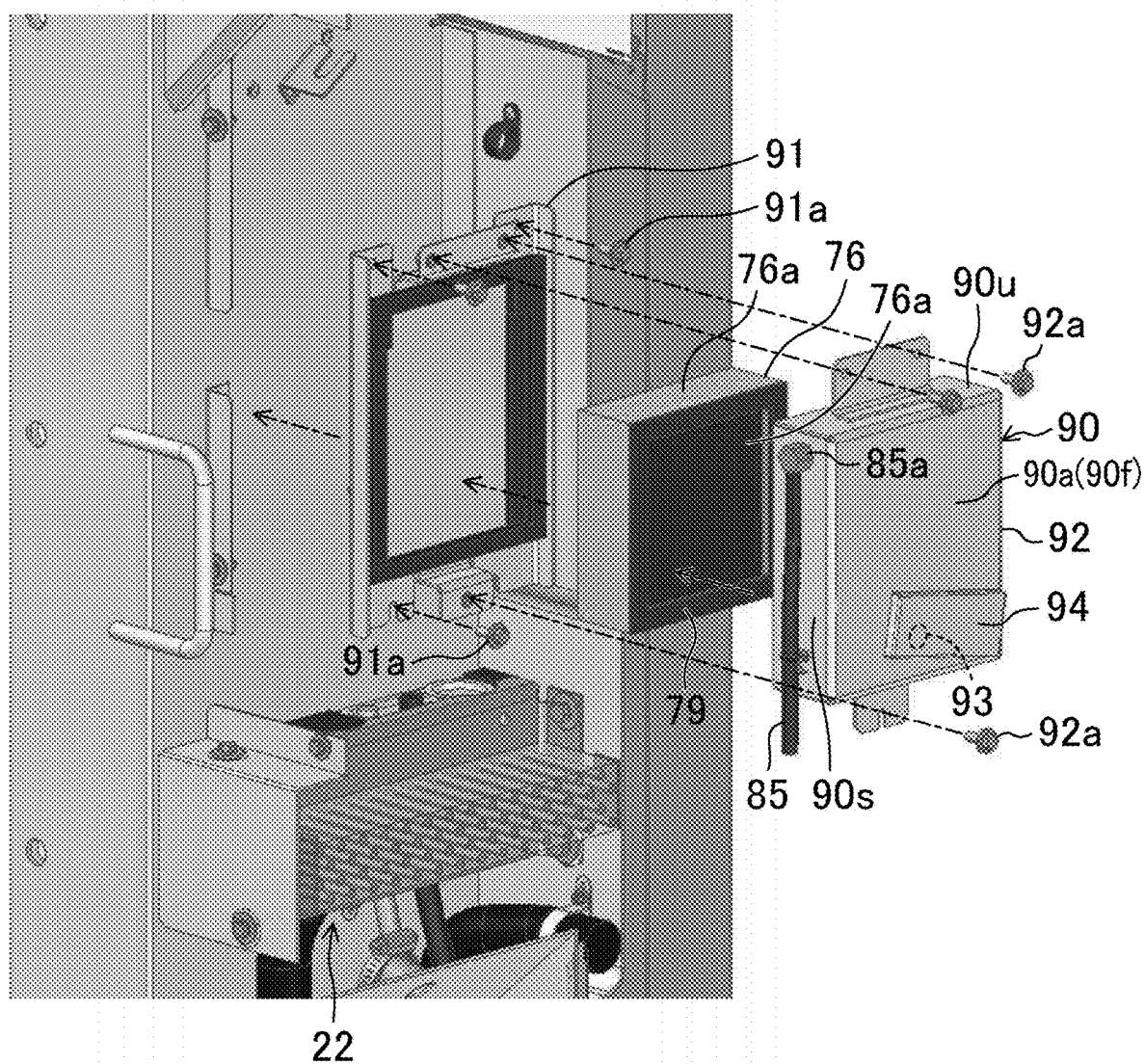
FIG. 8 is an exploded perspective view of FIG. 7.
Figure 9:
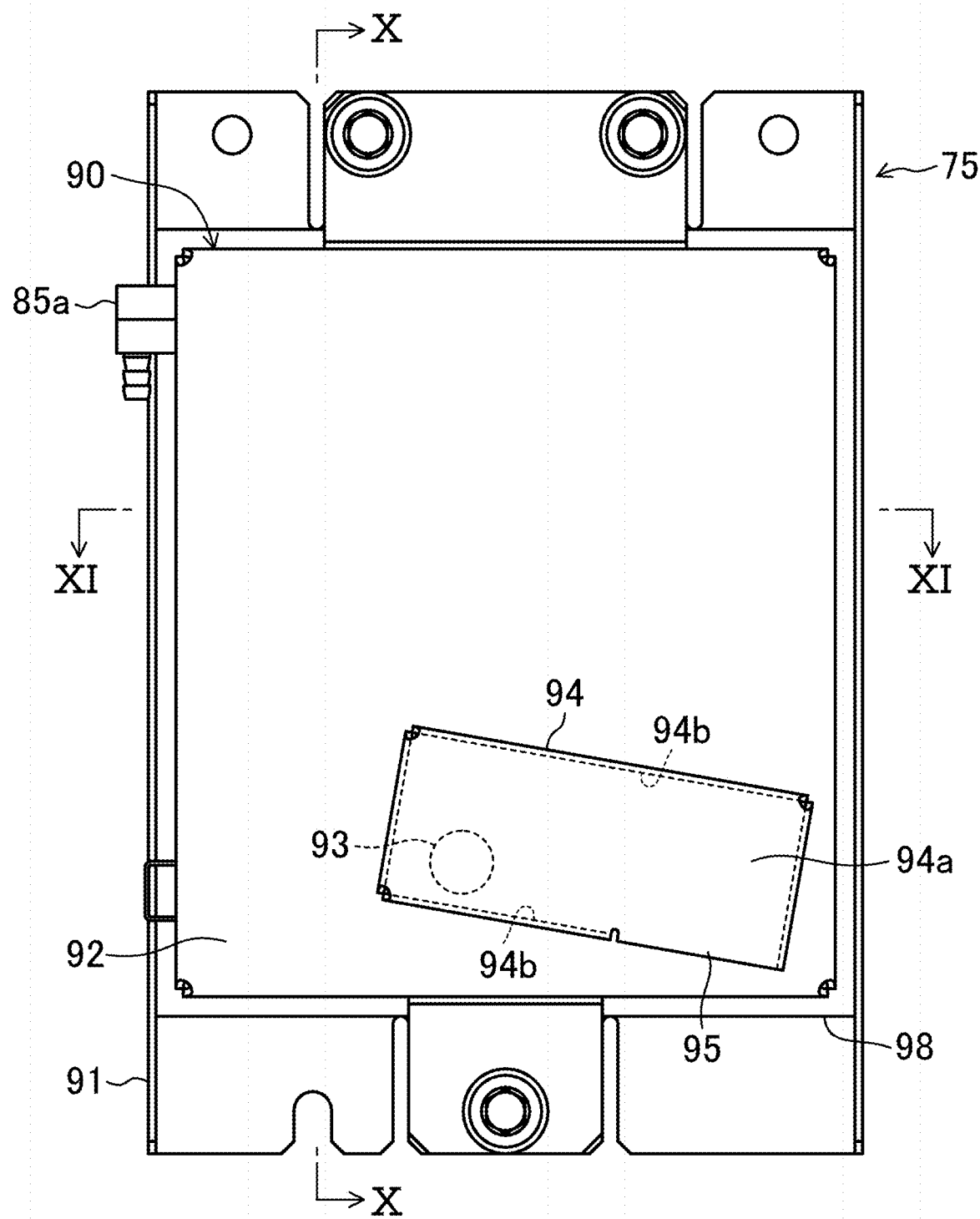
FIG. 9 is a front view of a filter unit.
Figure 10:
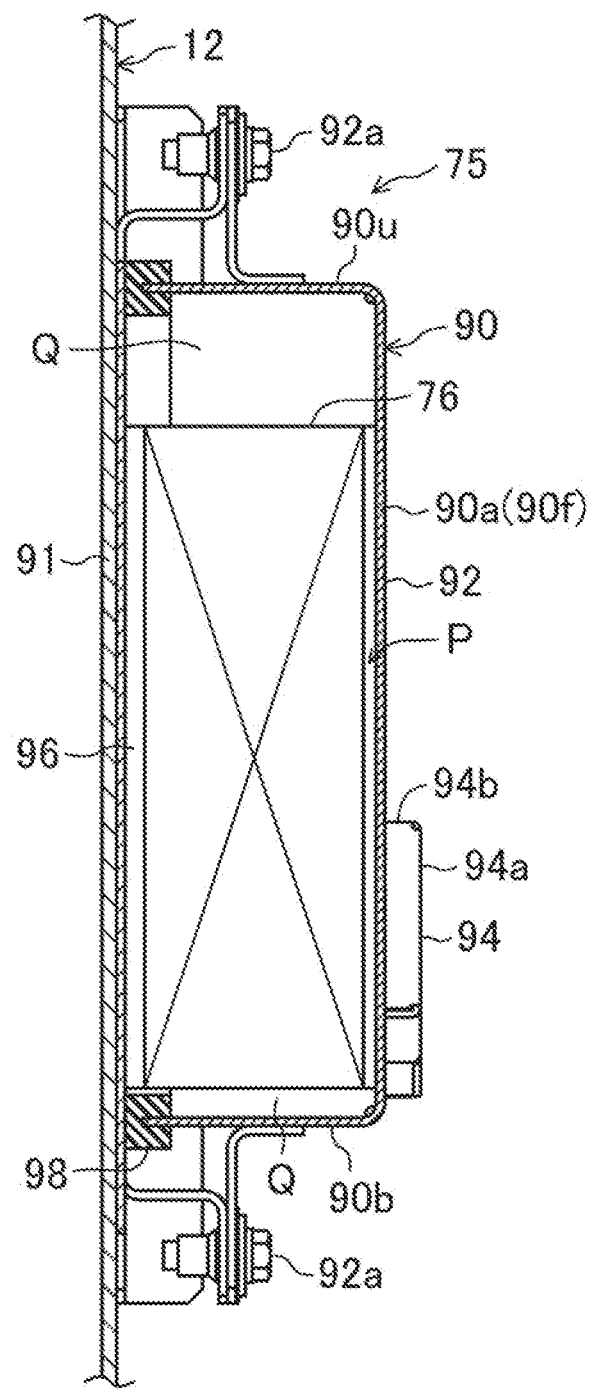
FIG. 10 is a cross-sectional view taken along a line X-X shown in FIG. 9.
Figure 11:
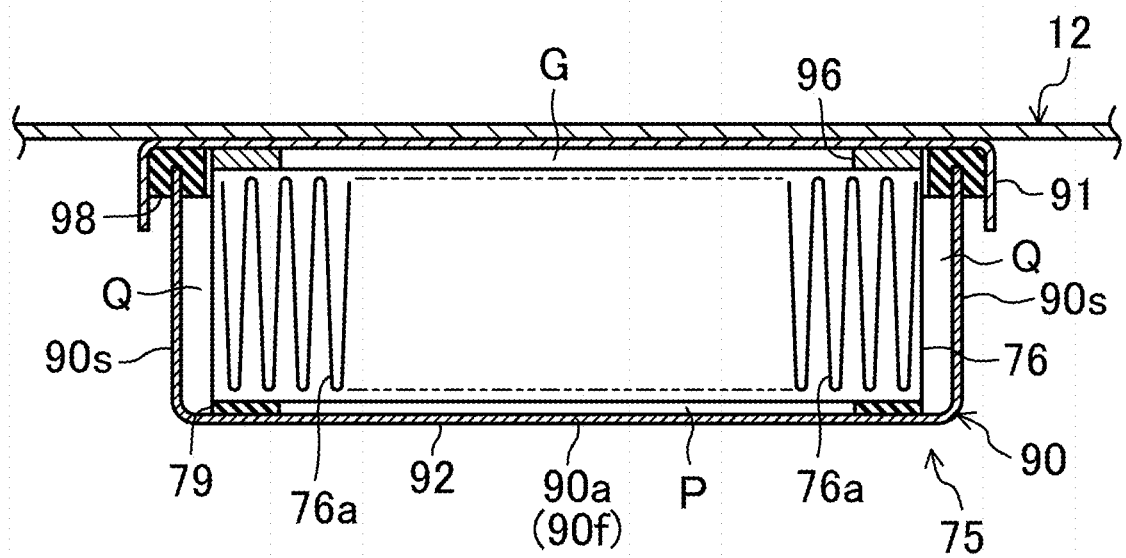
FIG. 11 is a cross-sectional view taken along a line XI-XI shown in FIG. 9.
Figure 12:
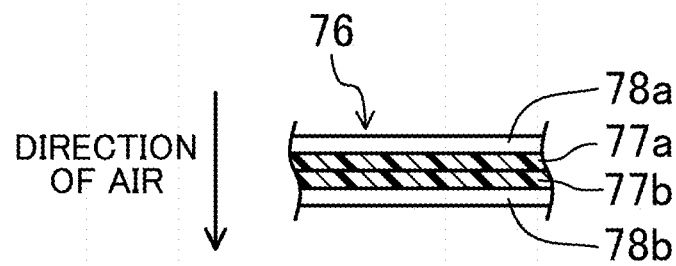
FIG. 12 is a view illustrating a cross-sectional structure of an air filter.

FIG. 7 is a perspective view of the filter unit (75) attached to the casing (12) of the container refrigeration apparatus (10). FIG. 8 is an exploded perspective view of the filter unit (75) of FIG. 7. FIG. 9 is a front view of the filter unit (75). FIG. 10 is a cross-sectional view taken along a line X-X in FIG. 9, FIG. 11 is a cross-sectional view taken along a line XI-XI in FIG. 9, and FIG. 12 is a view illustrating a cross-sectional structure of an air filter.

The filter unit (75) is provided with a filter box (90) and an air filter (76) housed in the filter box (90). The air filter (76) is in the shape of a rectangular parallelepiped, and the filter box (90) is a hollow member substantially in the shape of a hexahedron. One surface (76a) of the six surfaces of the air filter (76) serves as an air inflow surface, and the other surfaces air outflow surfaces. The air filter (76) is arranged such that all surfaces are spaced apart from the corresponding wall surfaces of the filter box (90). In addition, one of the surfaces of the filter box (90) corresponding to the air inflow surface of the air filter (76) constitutes an air intake surface (90a), in which an air intake port (93) is formed.

The filter box (90) includes a front wall (900 forming the air intake surface (90a), sidewalls (90s) positioned on the left and right sides of the air filter (76), an upper wall (90u) positioned above the air filter (76), and a bottom wall (90b) positioned below the air filter (76).

A space between the air filter (76) and the filter box (90) includes two types of spaces, namely, a primary space (P) which is present between the air intake surface (90a) provided with the air intake port (93a) and the air inflow surface of the air filter (76) and through which the air flows toward the air filter (76), and a plurality of secondary spaces (Q), each of which is present between one of the other surfaces of the air filter (76) and an associated one of the wall surfaces of the filter box (90) and into which the air flows from the air filter (76). A seal packing (79) which closely adheres to the air filter (76) and the filter box (90) is provided at the peripheral edge of a front surface of the air filter (76) to separate the primary space (P) from the secondary spaces (Q).

In one of the surfaces of the filter box (90) forming the secondary spaces (Q), a tube joint (85a) to which the other end of the air tube (85) is connected is provided as an air outflow port. Specifically, the tube joint (85a) is provided for the left side surface of the filter box (90) in FIG. 9.

The filter box (90) includes a base member (91) fixed to the casing (12) of the container refrigeration apparatus (10) with screws (91a), and a box body (92) that houses the air filter (76) therein and is fixed to the base member (91) with screws (92a). A packing (98) is provided between the base member (91) and the box body (92) to keep the internal space of the filter box (90) airtight.

The air intake port (93) of the filter box (90) is formed near the lower end of the air intake surface (90a) of the filter box (90). The air intake surface (90a) of the filter box (90) is provided with an intake port cover (94) covering the air intake port (93). The intake port cover (94) includes a front cover plate (94a) opposed to the air intake surface (90a), and a peripheral cover plate (94b) formed on a peripheral edge of the front cover plate (94a). The peripheral cover plate (94b) is partially cut out to form a ventilation hole (95) in the peripheral cover plate (94b) below the air intake port (93).

Specifically, the front cover plate (94a) of the intake port cover (94) is rectangular, and has a lower side inclined with respect to a horizontal line. The ventilation hole (95) is formed in a predetermined range of a portion of the peripheral cover plate (94b) corresponding to the lower side of the front cover plate (94a).

The filter box (90) includes the base member (91) as a back wall facing the back surface of the air filter (76). A spacer (96) forming a communication passage (G) is provided between the back surface of the air filter (76) and the base member (91) serving as the back wall of the filter box (90).

As shown in FIG. 11, the air filter (76) is a pleated filter having a plurality of pleats (76a). The air filter (76) includes filter substrates (77a, 77b), each of which is made of a membrane filter having waterproofness and air permeability, and fibrous coating layers (78a, 78b) respectively covering the surfaces of the filter substrates (77a,77b). The membrane filter is made of polytetrafluoroethylene (PTFE). Nonwoven fabric is used as the coating layers (78a, 78b). The air filter (76) is disposed such that the pleats (76a) extend in the vertical direction.

The air filter (76) includes a stack of a plurality of (two in this embodiment) filter substrates (77a, 77b), and the coating layers (78a, 78b) are respectively formed on the filter substrates (77a, 77b). The front and back surfaces of the stack of the filter substrates (77a, 77b) are respectively covered with the coating layers (78a, 78b). The filter substrate (77a) may include only a single layer, and in this case, the coating layer (78a) made of nonwoven fabric is provided on the surface of the layer from which the air is sucked.

—Operation—

<Operation of Refrigerant Circuit>

In this embodiment, a unit controller (100) shown in FIG. 3 performs a cooling operation for cooling the air in the container (11).

During the cooling operation, the unit controller (100) controls the operation of the compressor (21), the expansion valve (23), the external fan (25), and the internal fans (26) such that the temperature of the air in the container reaches a desired target temperature based on measurement results provided by a temperature sensor (not shown). In this case, the refrigerant circuit (20) allows the refrigerant to circulate to perform a vapor compression refrigeration cycle. Then, the air in the container (11) guided to the internal storage space (S2) by the internal fans (26) is cooled when passing through the evaporator (24) by the refrigerant flowing through the evaporator (24). The air in the container cooled by the evaporator (24) passes through the underfloor path (19a), and is blown again into the internal space (S) of the container (11) via the blowout port (18b). Thus, the air in the container (11) is cooled.

<Basic Operation of Gas Supply Device>

The gas supply device (30) alternately repeats a first operation (see FIG. 4) in which the first adsorption column (34) is pressurized and the second adsorption column (35) is depressurized simultaneously, and a second operation (see FIG. 5) in which the first adsorption column (34) is depressurized and the second adsorption column (35) is pressurized simultaneously, each for predetermined periods of time (e.g., 14.5 seconds) so as to produce the nitrogen-enriched air and the oxygen-enriched air. In the present embodiment, the pressure equalization operation (not shown) in which both of the first adsorption column (34) and the second adsorption column (35) are pressurized is performed for a predetermined time (for example, 1.5 seconds) between the first operation and the second operation. The controller (55) controls the first and second directional control valves (32) and (33) to perform the switching among these operations.

<<First Operation>>

During the first operation, the controller (55) switches the first and second directional control valves (32) and (33) to the first state shown in FIG. 4. Thus, the air circuit (3) is set to the first connection state in which the first adsorption column (34) communicates with the outlet of the first pump mechanism (31a) and is blocked from the inlet of the second pump mechanism (31b), and simultaneously, the second adsorption column (35) communicates with the inlet of the second pump mechanism (31b) and is blocked from the outlet of the first pump mechanism (31a).

The first pump mechanism (31a) supplies the compressed outside air to the first adsorption column (34). A nitrogen component contained in the air that has flowed into the first adsorption column (34) is adsorbed on the adsorbent of the first adsorption column (34). Thus, during the first operation, the first pump mechanism (31a) supplies the compressed outside air to the first adsorption column (34), in which the adsorbent adsorbs the nitrogen component in the outside air. As a result, oxygen-enriched air having a lower nitrogen concentration and a higher oxygen concentration than the outside air is produced. The oxygen-enriched air flows from the first adsorption column (34) to the oxygen discharge passage (45).

On the other hand, the second pump mechanism (31b) sucks the air from the second adsorption column (35). Simultaneously, the second pump mechanism (31b) also sucks the nitrogen component that has been adsorbed onto the adsorbent in the second adsorption column (35) together with the air, thereby allowing the adsorbent to desorb the nitrogen component. Thus, during the first operation, the second pump mechanism (31b) sucks the air out of the second adsorption column (35) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

<<Second Operation>>

During the second operation, the controller (55) switches the first and second directional control valves (32) and (33) to the second state shown in FIG. 5. Thus, the air circuit (3) is set to the second connection state in which the first adsorption column (34) communicates with the inlet of the second pump mechanism (31b) and is blocked from the outlet of the first pump mechanism (31a), and simultaneously, the second adsorption column (35) communicates with the outlet of the first pump mechanism (31a) and is blocked from the inlet of the second pump mechanism (31b).

The first pump mechanism (31a) supplies the compressed outside air to the second adsorption column (35). A nitrogen component contained in the air that has flowed into the second adsorption column (35) is adsorbed on the adsorbent of the second adsorption column (35). Thus, during the second operation, the first pump mechanism (31a) supplies the compressed outside air to the second adsorption column (35), in which the adsorbent adsorbs the nitrogen component in the outside air. As a result, oxygen-enriched air having a lower nitrogen concentration and a higher oxygen concentration than the outside air is produced. The oxygen-enriched air flows out from the second adsorption column (35) to the oxygen discharge passage (45).

On the other hand, the second pump mechanism (31b) sucks the air from the first adsorption column (34). Simultaneously, the second pump mechanism (31b) also sucks the nitrogen component that has been adsorbed onto the adsorbent in the first adsorption column (34) together with the air, thereby allowing the adsorbent to desorb the nitrogen component. Thus, during the second operation, the second pump mechanism (31b) sucks the air out of the first adsorption column (34) to allow the adsorbent to desorb the nitrogen component adsorbed thereon. This produces nitrogen-enriched air containing the nitrogen component desorbed from the adsorbent, and having a higher nitrogen concentration and a lower oxygen concentration than the outside air. The nitrogen-enriched air is sucked into the second pump mechanism (31b), compressed, and discharged toward the supply passage (44).

As mentioned above, during the first operation, the first adsorption column (34) is pressurized by the first pump mechanism (31a) to perform the adsorption operation, whereas the second adsorption column (35) is depressurized by the second pump mechanism (31b) to perform the desorption operation. During the second operation, the second adsorption column (35) is pressurized by the first pump mechanism (31a) to perform the adsorption operation, whereas the first adsorption column (34) is depressurized by the second pump mechanism (31b) to perform the desorption operation. Thus, when the first operation is switched to the second operation or the second operation is switched to the first operation without the pressure equalization operation performed between the first and second operations, the pressure in the adsorption column where the desorption operation has been performed before the switching is remarkably low right after the switching. Thus, it takes time until the pressure in this adsorption column increases, and the adsorption operation does not start soon.

Thus, in this embodiment, the air circuit (3) is switched to the third connection state when the first operation is switched to the second operation and when the second operation is switched to the first operation, so that the first and second adsorption columns (34) and (35) communicate with each other via the first and second directional control valves (32) and (33). In this configuration, the internal pressures of the first and second adsorption columns (34) and (35) are immediately equalized (i.e., become intermediate pressures between the respective inner pressures). The pressure equalization operation immediately increases the pressure in the adsorption column which has been depressurized by the second pump mechanism (31b) and performing the desorption operation before the switching. Thus, the adsorption operation is performed immediately after the connection with the first pump mechanism (31a).

In this manner, the gas supply device (30) alternately repeats the first and second operations, with the pressure equalization operation performed between the first and second operations, thereby producing the nitrogen-enriched air and the oxygen-enriched air in the air circuit (3).

Advantages of Embodiment

According to the present embodiment, the fibrous coating layers (78a, 78b) are formed on the surfaces of the filter substrates (77a, 77b) each of which is made of the membrane filter. Thus, even if sea salt particles adhere to the air filter (76) to cause a deliquescence phenomenon, moisture does not form a water film on the surfaces of the fibrous coating layers (78a, 78b), and is absorbed into the coating layers (78a, 78b) by capillarity. This can suppress increase in the pressure loss of the air filter (76). Further, since excessive increase in the pressure loss can be suppressed, it is possible to suppress the flow of water from the space upstream of the air filter (76) to the downstream space, and the damage to the air pump (31) can be reduced. According to the present embodiment, even when the gas supply device is used under the condition that salt damage may possibly be caused to the gas supply device, it is possible to suppress shortening of the life of the air filter (76) due to the deliquescence phenomenon caused by the sea salt particles.

According to the present embodiment, when the air pump (31) supplies the gas to the target space (S) via the filter unit (75), the gas passes through a pleated filter having a large gas passage area. The surfaces of the filter substrates (77a, 77b) of the pleated filter are covered with the fibrous coating layers (78a, 78b). Therefore, the air filter (76) on which a water film is less likely formed has a large gas passage area, and the pressure loss of the air filter (76) does not easily increase. This can extend the life of the air filter (76).

In addition, according to this embodiment, when water adheres to the air filter (76) and is not absorbed by the coating layers (78a, 78b), water goes down along the pleats (76a) on the surface of the air filter (76), and drips down from the air filter (76) when reaching the lower end of the pleats (76a). Thus, it is possible to suppress increase in the pressure loss due to water adhered to the surface of the air filter (76). This can further extend the life of the air filter (76).

Further, according to the present embodiment, the air filter (76) has a plurality of filter substrates (77a, 77b). This can suppress entry of water into the air pump (31) and the target space (S), and can protect the air pump (31) and the contents of the target space (S) from damage caused by water.

OTHER EMBODIMENTS

The foregoing embodiment may be modified as follows.

For example, in the embodiment described above, the gas supply device (30) sucks the air from the filter unit (75), and feeds the nitrogen-enriched air into the internal space (S), which is the target space (S), of the container (11). However, the target space (S) is not necessarily the internal space (S) of the container (11), and the gas to be fed is not necessarily the nitrogen-enriched air. For example, the gas supply device may be a device for supplying outside air into a storehouse in a coastal area.

In the filter box (90) of the embodiment, the tube joint (85a), which is an air outflow port through which the air is taken out of the secondary spaces of the air filter (76), is not necessarily provided on the sidewall (90s) of the filter box (90), but may be provided on the upper wall (90u) or front wall (90f) of the filter box (90), for example.

In the above-described embodiment, the air filter (76) having the membrane filter is disposed in the gas passage (40) of the air circuit (3) to which the adsorption columns (34, 35) each provided with the adsorbent for adsorbing the nitrogen component in the air are connected, so that the air that has passed through the air filter (76) flows into the adsorption columns (34, 35). However, the gas supply device (30) to which the air filter (76) is applied is not limited to the one using the absorption columns (34, 35), but may be the one using a separation film that separates oxygen or carbon dioxide from the air to control the concentration of the components of the air in the container. Although the specific circuit configuration of such a device is not shown in the drawings, an air filter (76) having a membrane filter is provided on the side of the separation film from which the air is sucked into. This configuration can suppress shortening of the life of the air filter (76) due to a deliquescence phenomenon caused by sea salt particles, and can also suppress entry of water into the separation film.

INDUSTRIAL APPLICABILITY

As can be seen in the foregoing, the present disclosure is useful for a gas supply device including a gas passage that supplies gas to a target space, a filter unit provided at an inlet of the gas passage, and an air pump provided in the middle of the gas passage, an inside air control system that supplies a gas mixture having a small content of oxygen and a large content of nitrogen to the target space, and a container refrigeration apparatus including the inside air control system.

DESCRIPTION OF REFERENCE CHARACTERS

10 Container Refrigeration Apparatus
11 Container
12 Casing
20 Refrigerant Circuit
30 Gas Supply Device
31 Air Pump
38 Gas Mixture Generator
40 Gas Passage
60 Inside Air Control System
75 Filter Unit
76 Air Filter
76a Pleat
77a Filter Substrate
77b Filter Substrate
78a Coating Layer
78b Coating Layer
90 Filter Box
S Internal Space (Target Space)

The invention claimed is:
1. A container refrigeration apparatus, comprising:
a casing mounted on a container for use in marine transportation;

components of a refrigerant circuit attached to the casing; and an inside air control system attached to the casing, wherein the container refrigeration apparatus is configured to cool an internal space of the container, and supply a gas mixture to the internal space of the container using the inside air control system, and the inside air control system includes:
- a gas supply device; and
- a gas mixture generator that generates a gas mixture having a higher nitrogen concentration and a lower oxygen concentration than air sucked through a filter unit of the gas supply device, the gas supply device includes:
- a gas passage that supplies gas to an indoor space;
- a filter unit provided at an inlet of the gas passage; and
- an air pump provided in the middle of the gas passage and configured to supply gas generated by the gas mixture generator to the indoor space, the filter unit includes a filter box having an air intake surface and a plurality of wall surfaces and an air filter housed in the filter box such that a space between the air filter and the filter box includes a primary space which is present between the air intake surface of filter box and an air flow surface of the air filter and a plurality of secondary spaces, each of the plurality of secondary spaces being present between another surface of the air filter and an associated one of the wall surfaces of the filter box, the air filter includes a filter substrate made of a membrane filter having waterproofness and air permeability, and a fibrous coating layer covering a surface of the filter substrate through which air is sucked, the fibrous coating layer being water absorbent, the filter box further includes an integral seal packing which adheres to the air filter and the filter box, the integral seal packing adhering to the air filter around a peripheral edge of the air filter and adhering to the filter box around a peripheral edge of the air intake surface of the filter box to separate the primary space from the secondary spaces.

2. The container refrigeration apparatus of claim 1, wherein the air filter includes a stack of a plurality of filter substrates.

* * * * *